United States Patent
Lee et al.

(10) Patent No.: US 7,032,450 B2
(45) Date of Patent: Apr. 25, 2006

(54) METHOD AND APPARATUS FOR MEASURING SPEED OF LAND VEHICLE USING ACCELEROMETER

(75) Inventors: Kook-Yeon Lee, Suwon-si (KR); Hyun-Su Hong, Seongnam-si (KR); Yoon-Deock Lee, Seoul (KR); Jin-Won Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/885,984

(22) Filed: Jul. 7, 2004

(65) Prior Publication Data

US 2005/0139004 A1    Jun. 30, 2005

(30) Foreign Application Priority Data

Dec. 26, 2003  (KR) ..................... 10-2003-0097476

(51) Int. Cl.
*G01P 15/00* (2006.01)

(52) U.S. Cl. ............................. 73/488; 701/70; 701/1; 702/141

(58) Field of Classification Search .......... 73/488–492, 73/514.02; 702/96, 141, 142; 701/1, 70
See application file for complete search history.

(56) References Cited

U.S. PATENT DOCUMENTS

| | | | | | |
|---|---|---|---|---|---|
| 4,531,300 A | * | 7/1985 | Heidel et al. | ............. | 33/366.13 |
| 5,265,472 A | * | 11/1993 | Pfeifle et al. | ............. | 73/514.02 |
| 5,446,658 A | * | 8/1995 | Pastor et al. | .................... | 701/1 |
| 5,774,832 A | * | 6/1998 | Vanderwerf | ................. | 701/220 |
| 5,828,987 A | * | 10/1998 | Tano et al. | ................. | 702/150 |
| 5,925,087 A | * | 7/1999 | Ohnishi et al. | ............... | 701/70 |
| 5,986,583 A | * | 11/1999 | Nakano et al. | ............. | 340/988 |

\* cited by examiner

*Primary Examiner*—Helen Kwok
(74) *Attorney, Agent, or Firm*—Dilworth & Barrese LLP

(57) ABSTRACT

Disclosed is an apparatus and a method for measuring the speed of a land vehicle using an accelerometer. The method includes the steps of storing measurement data provided from an accelerometer; analyzing the measurement data to determine whether the vehicle is stopped; calculating a road angle using the measurement data of the accelerometer when it is determined, upon analysis, that the vehicle is moving; determining the sign of the road angle when the road angle is greater than a threshold value; compensating for a gravitational acceleration component included in the measurement data of the accelerometer using the road angle; and calculating the speed of the vehicle based on the acceleration of the vehicle with the gravitational acceleration component compensated. It is possible to reduce the number of expensive gyroscopes needed for a vehicle speed measuring apparatus, thereby reducing the cost of the apparatus.

13 Claims, 4 Drawing Sheets

GRAVITY COMPONENT DETECTING PROCESS

METHOD AND APPARATUS FOR MEASURING SPEED OF LAND VEHICLE USING ACCELEROMETER

PRIORITY

This application claims priority to an application entitled "Method and Apparatus for Measuring Speed of Land Vehicle Using Accelerometer" filed in the Korean Intellectual Property Office on Dec. 26, 2003 and assigned Serial No. 2003-97476, the contents of which are hereby incorporated by reference.

BACKGROUND OF THE INVENTION

1. Field of the Invention

The present invention relates to an apparatus for measuring the speed of a moving land vehicle, and more particularly to an apparatus and a method for measuring the speed of a moving land vehicle using an accelerometer.

2. Description of the Related Art

Generally, vehicles (such as ships, aircrafts and cars) have an embedded navigation system that tracks the position of a vehicle, routes a path to a given destination and provides the routing results. In order to provide a path to the destination, navigation systems should be able to determine the exact position of a vehicle.

Therefore, navigation systems generally include a positioning device for position determination. Such positioning devices are classified into two types, one for determining the position using an outside source and the other for determining the position using an inside sensor. A GPS (Global Positioning System) is an example of the former type of positioning device. A DR (Dead Reckoning) system using an inertial sensor is an example of the latter type of positioning device.

A DR system comprising an inertial sensor, a so-called INS (Inertial Navigation System), was developed for the first time by the Massachusetts Institute of Technology in the U.S. at the beginning of the 1950s and put to practical use in the 1960s. INS systems calculate the speed and position of a moving vehicle using a gyroscope for detecting a rotational motion and an accelerometer for detecting a straight line motion.

The basic principle of operation of the INS systems is summarized as follows. INS systems autonomously calculate the current speed and position of a vehicle by integrating an output from the gyroscope that measures a rotational angular speed to obtain a moving direction angle of the vehicle, compensating for a gravitational acceleration from an output from the accelerometer and then integrating the resulting values. INS systems can provide accurate and continuous navigation data during a short period of time. However, errors may accumulate with the lapse of time due to the integration processes. In order to practically use the INS system, expensive and precise gyroscopes and accelerometers are required. Most INS systems are used together with a non-inertial auxiliary sensor, such as a magnetic compass or a GPS, rather than being used alone, to ensure high accuracy and long-term stability.

As explained above, the speed of a moving vehicle can be calculated by combining speed information obtained from an accelerometer with moving direction information obtained from a gyroscope.

Generally, in the known systems, three mutually orthogonal uniaxial gyroscopes and three mutually orthogonal uniaxial accelerometers are required to calculate the accurate speed of a vehicle in three-dimensional space. For certain kinds of vehicles, the speed can be obtained using a lesser number of sensors. In the case of a car, for example, the roll motion which is the rotational motion of the wheel axles and the straight line motion in a direction perpendicular to the ground surface can be ignored when calculating the speed of the car. Since sensors for detecting such motions are not required, the number of sensors for calculating the speed of a car can be reduced by the number of such unnecessary sensors.

In order to obtain a velocity vector of a vehicle moving on the road using a DR system with an inertial sensor, it is necessary to measure the moving direction angle of the vehicle and the speed in the moving direction. For the measurement of the moving direction angle, a gyroscope is installed on an axis perpendicular to the plane on which the axles of the vehicle are placed. For the measurement of the speed in the moving direction, a device for measuring an inclination angle of the road is required in addition to an accelerometer installed in the direction of axles.

The DR system measures the road inclination angle to obtain the velocity vector of the vehicle and enable the accelerometer to provide measurement data including a gravitational acceleration which can be calculated from the road inclination angle. The gravitational acceleration acts always in a direction normal to the surface of the earth spheroid (a spherical surface perpendicular to directions of the gravitational acceleration). When the direction of an axis of the accelerometer mounted in the vehicle (fixed in a particular direction within the vehicle) is changed due to a change in the road inclination angle, the gravitational acceleration component included in the output from the accelerometer is also changed. Accordingly, a pure motional acceleration of the vehicle can be obtained only when the gravitational acceleration component changing according to the road inclination angle is eliminated from the output of the accelerometer. However, neither the motional acceleration in the vehicle travel direction nor the gravitational acceleration component can be obtained without any information about the road inclination angle. Therefore, it is not possible to obtain the accurate speed of the vehicle.

FIG. 1 is a view explaining gravity compensation for an output from the accelerometer. Referring to FIG. 1, the road inclination angle refers to degrees from the horizontal plane which is perpendicular to the direction ±g of the gravitational acceleration. In FIG. 1, the road inclination angle θ is an angle made by the horizontal plane 10 perpendicular to the direction ±g of the gravitational acceleration and a sloped plane 20 extending in the moving direction of a car 30.

When the car 30 travels on the sloped plane 20 which rises at a predetermined angle θ from the horizontal plane 10 perpendicular to the direction ±g of the gravitational acceleration, the acceleration $\vec{a}$ measured by the accelerometer mounted in the car 30 can be denoted by Equation 1.

$$\vec{a} = \vec{r_a} + \vec{g} \qquad (1)$$

The acceleration $\vec{a}$ measured by the accelerometer mounted in the car 30 includes the real acceleration $\vec{r_a}$ and a component of the gravitational acceleration $\vec{g}$ of the earth. The component of the gravitational acceleration $\vec{g}$ is measured together with a rate of change in the actual speed of motion and may cause a big error in the measurement of speed.

Therefore, DR systems for vehicles are required to subtract the gravitational acceleration $\vec{g}$ from the acceleration $\vec{a}$ measured by the accelerometer in order to accurately measure the speed of a vehicle, and obtain the road inclination angle in order to measure the gravitational acceleration $\vec{g}$. To this end, a gyroscope or a clinometer is additionally provided in general DR systems.

In a conventional DR system, two or more gyroscopes are generally used to measure an angle of road inclination. In other words, a conventional DR system requires one gyroscope for determining the direction of motion and the other for determining the road inclination angle. Since gyroscopes are basically sensors for detecting a rate of change, a vehicle DR system integrates the output from the gyroscopes to obtain the road inclination angle. Therefore, when an angle of road inclination is measured using the gyroscopes, an error component can be integrated during integration of the output from the gyroscopes, thereby causing accumulation of estimated errors in the road inclination angle with the lapse of time.

Because of this drawback, a gyroscope is not used alone to measure the road inclination angle, but with the aid of an auxiliary sensor having no error accumulation property. Although an auxiliary sensor, such as a clinometer, can be additionally used to obtain an accurate angle of road inclination, the accelerometer already mounted in a vehicle is commonly used as an auxiliary sensor to reduce the number of sensors.

FIG. 2 is a diagram explaining a process of measuring a gravity component from an output of the accelerometer in the prior art. Referring to FIG. 2, a conventional DR system measures a relatively low-frequency component of the gravitational acceleration by passing an output from the accelerometer, which includes a gravitational acceleration component (a) and a real acceleration component (b), through a low pass filter (LPF) 40, and thereby calculates an angle of road inclination.

Although the conventional system has no error accumulation property, it is sensitive to the capacity of the accelerometer and insensitive to the change in the inclination angle. Also, since a low cut-off frequency is used to separate the gravity component, a time delay problem may be caused.

As a solution to these problems, an estimate obtained from a gyroscope, which is sensitive to instantaneous changes, is fused with that obtained from the accelerometer, which has no error accumulation property, to obtain an estimate of the road inclination angle which has less error accumulation and is insensitive to changes.

Since it is not possible to obtain an accurate gravitational acceleration using the accelerometer only or to calculate an accurate angle of road inclination from the obtained gravity acceleration, conventional vehicle DR systems utilize an additional gyroscope for estimating the road inclination angle. However, DR systems with an expensive gyroscope cannot be supplied at a low price.

SUMMARY OF THE INVENTION

Accordingly, the present invention has been made to solve the above-mentioned problems occurring in the prior art, and a first object of the present invention is to provide a cost-efficient DR speed measuring apparatus utilizing an accelerometer and a method for measuring the speed of a moving land vehicle using the same.

A second object of the present invention is to provide an apparatus and a method for measuring a gravitational acceleration component included in an acceleration component of a land vehicle using an accelerometer.

A third object of the present invention is to provide an apparatus and a method for measuring a gravitational acceleration component using an accelerometer and thereby measuring the speed of a moving land vehicle.

A fourth object of the present invention is to provide an apparatus and a method for more accurately obtaining a real acceleration of a moving land vehicle using a value measured by a biaxial accelerometer.

In order to accomplish the above objects of the present invention, there is provided a method for measuring the speed of a moving land vehicle, comprising: storing measurement data provided from an accelerometer; analyzing the measurement data to determine whether the vehicle is stopped; calculating a road angle using the measurement data of the accelerometer when it is determined, upon analysis, that the vehicle is moving; determining the sign of the road angle when the road angle is greater than a threshold value; compensating for a gravitational acceleration component included in the measurement data of the accelerometer using the road angle; and calculating the speed of the vehicle based on the acceleration of the vehicle with the gravitational acceleration component compensated. Preferably, measurement data provided from a biaxial accelerometer is used in this method.

In order to accomplish the above objects of the present invention, there is also provided an apparatus for measuring the speed of a moving land vehicle using a biaxial accelerometer, said apparatus comprising: an acceleration measuring section for measuring a current acceleration of the vehicle from the accelerometer mounted in the vehicle; an acceleration storing section for storing information about accelerations measured by the acceleration measuring section on a measurement time basis; a gravitational acceleration compensating section for analyzing measurement data provided from the accelerometer to determine whether the vehicle is stopped, calculating a road angle using the measurement data when it is determined that the vehicle is moving, determining the sign of the road angle when the road angle is greater than a threshold value, and compensating for a gravitational acceleration component included in the measurement data of the accelerometer using the road angle; and a speed calculating section for calculating the speed of the vehicle based on a real acceleration of the vehicle received from the gravitational acceleration compensating section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein will be omitted when it may make the subject matter of the present invention unclear.

Figure 1:
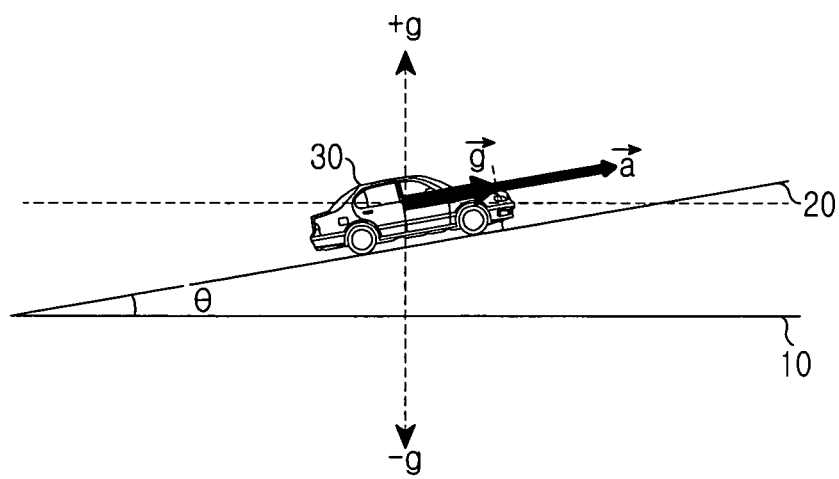
FIG. 1 is a view explaining gravity compensation for an output from an accelerometer.
Figure 2:
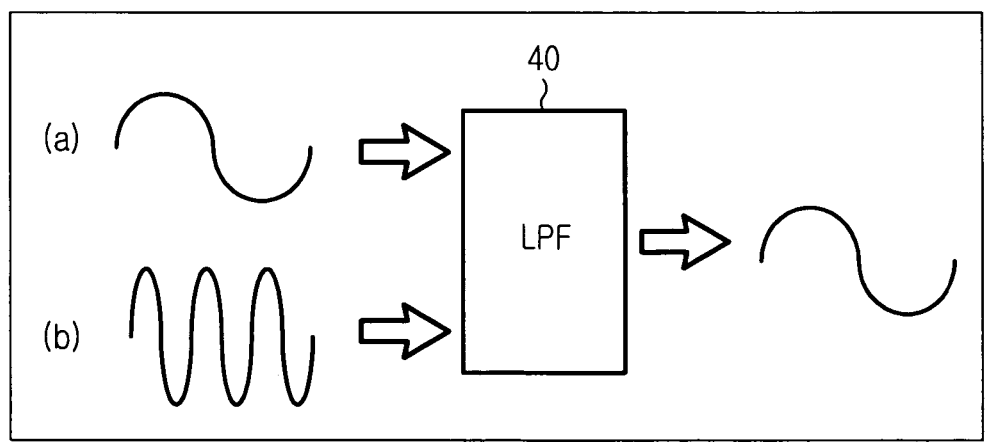
FIG. 2 is a diagram explaining a process of measuring a gravitational acceleration component from an output from an accelerometer in the prior art.
Figure 3:
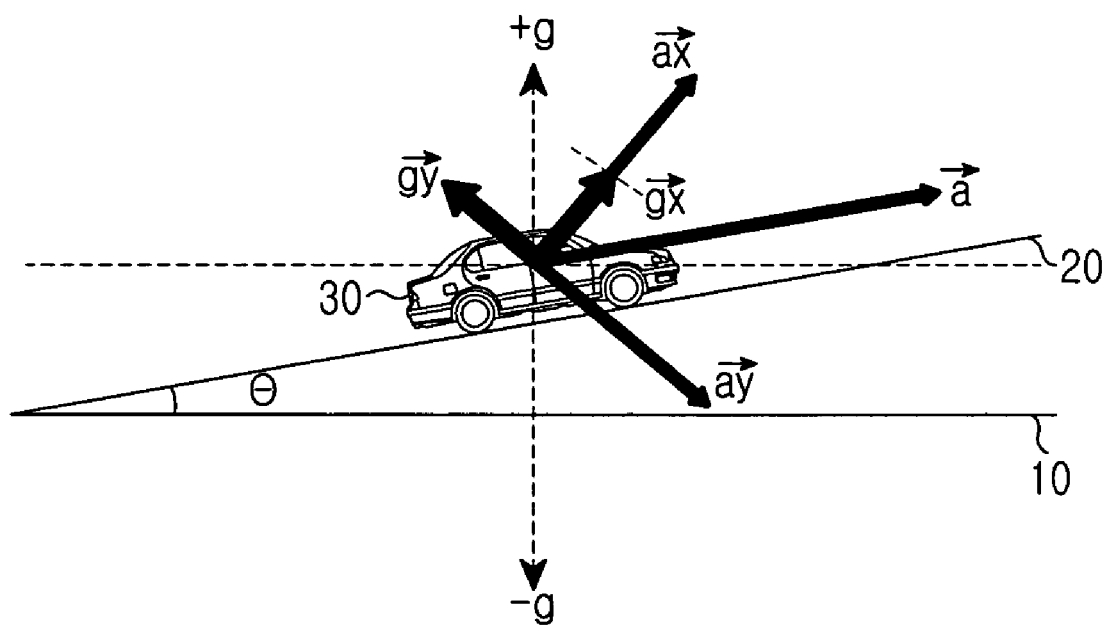
FIG. 3 is a view explaining gravity compensation for an output from an accelerometer using biaxial information of the accelerometer.

FIG. 3 is a view for explaining a gravity compensation for an output of an accelerometer using biaxial information of the accelerometer. Referring to FIG. 3, two accelerometers (or one biaxial accelerometer) are mounted in mutually orthogonal directions on the x- and y-axes of a car in order to detect the influence of a gravitational acceleration upon the acceleration measured by the accelerometers according to the motion of the car. In other words, when the car 30 is moving on the road 20 raised at an inclination angle of θ (the so-called pitch angle) from the horizontal plane 10 perpendicular to the direction of gravitational acceleration ±g, the acceleration $\vec{a}$ measured by the accelerometers is equal to the sum of the acceleration along the x-axis and the acceleration along the y-axis. The x-axis acceleration $\vec{a}_x$ and the y-axis acceleration $\vec{a}_y$ include the gravitational acceleration along the x-axis $\vec{g}_x$ and the gravitational acceleration along the y-axis $\vec{g}_y$, respectively.

Figure 4:
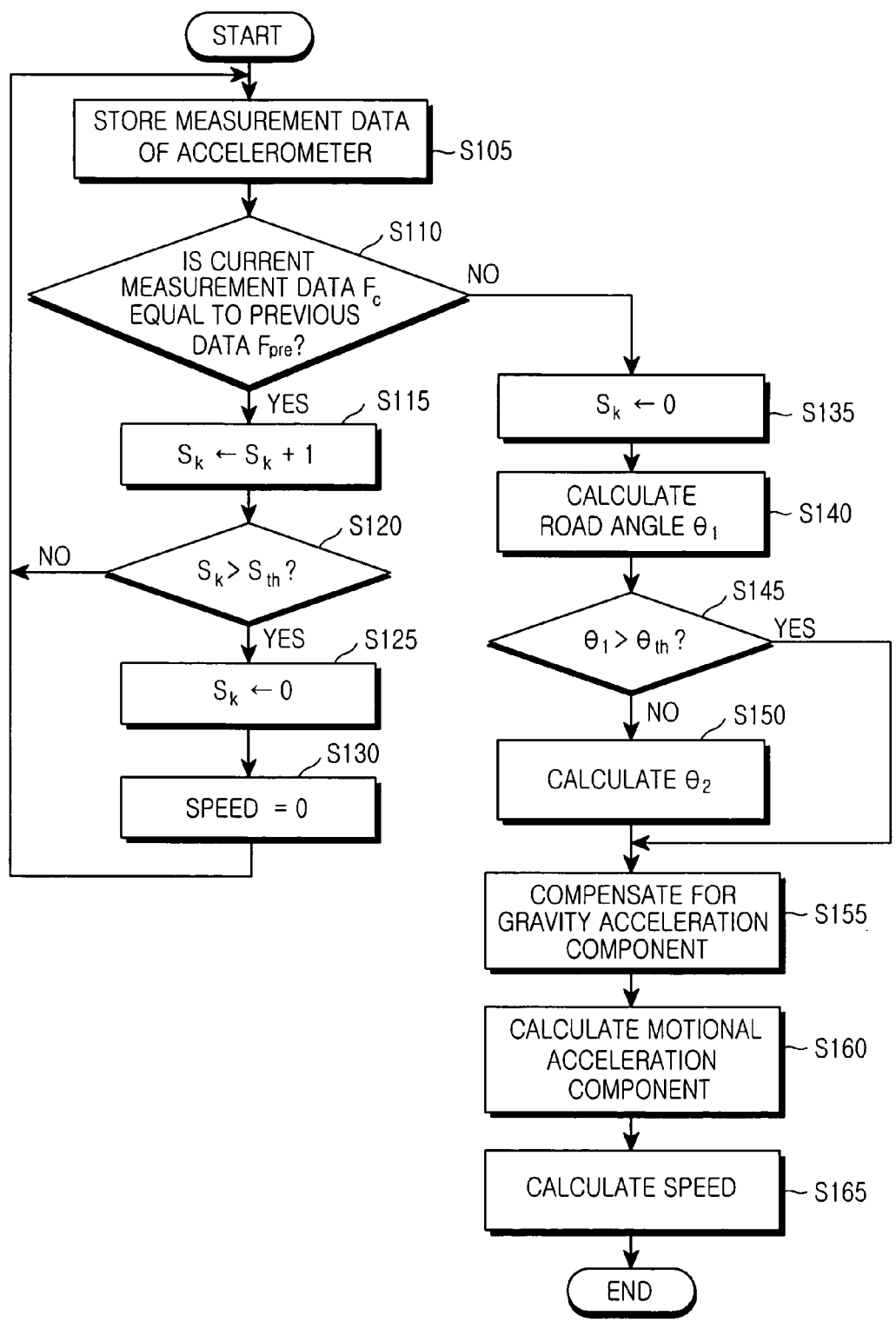
FIG. 4 is a flow chart showing a process of measuring the speed of a moving vehicle according to a preferred embodiment of the present invention.

FIG. 4 is a flow chart showing a process of measuring the speed of a moving vehicle according to the preferred embodiment of the present invention. Referring to FIGS. 3 and 4, a process of vehicle speed measurement using a biaxial accelerometer will be explained in detail.

In order to measure the speed of a car moving on the road, a speed measuring apparatus according to the present invention stores measurement data inputted from a biaxial accelerometer at step S105. Generally, measurement data $f_x$ and $f_y$ of the biaxial accelerometer are represented by Equation 2.

$$f_x = a_x + g_x + B_x = a \cos \alpha + g \sin(\alpha + \theta) + B_x$$
$$f_y = a_y + g_y + B_y = -a \cos \alpha + g \sin(\alpha + \theta) + B_y \quad (2)$$

wherein $f_x$ and $f_y$ are x-axis measurement data and y-axis measurement data provided from the accelerometer; $a_x$ and $a_y$ are acceleration components of the x- and y-axes; $g_x$ and $g_y$ are gravitational acceleration components of the x- and y-axes; and $B_x$ and $B_y$ are irregular constants in the stationary state. Generally, irregular constants refer to constants changing whenever power is supplied to a system and having different values at different sensors. Irregular constants have a property that maintains a fixed value until the next power supply. The irregular constants $B_x$ and $B_y$ in the present invention are constants changing whenever power is applied to the accelerometer. The irregular constants are defined as peculiar constants obtained by a test or a calculation. The process of obtaining B will not be explained herein.

Upon input of the measurement data from the accelerometer at step S105, the speed measuring apparatus compares the current measurement data $f_c$ of the accelerometer with the previous measurement data $f_{pre}$ at step S110 to determine whether the car is in stationary state. If the two measurement data $f_c$ and $f_{pre}$ are identical, the speed measuring apparatus determines that the car has stopped.

However, even during the movement of the car, the two measurement data $f_c$ and $f_{pre}$ may be instantaneously outputted at the same value due to a sensing error of the accelerometer, or due environmental factors. Also, the two measurement data $f_c$ and $f_{pre}$ may be identical when the car is moving at a constant velocity.

Therefore, in order to reduce such errors, it is preferable to perform steps S115 to S120 to determine whether the car is really in stationary state. If the two measurement data $f_c$ and $f_{pre}$ are determined to be identical at step S110, the speed measuring apparatus counts the consecutive times, i.e., the frequency $S_k$, of such determinations at step S115 and compares the frequency $S_k$ with a preset threshold value $S_{th}$ for determining the stationary state at step S120. Only when the counted frequency $S_k$ is greater than the threshold value $S_{th}$, the apparatus determines that the car is stopped. When the counted frequency $S_k$ is not greater than the threshold value $S_{th}$, the car is not deemed stopped. Particularly, when the car moves at a constant velocity, the counted value $S_k$ cannot increase up to the threshold value $S_{th}$ due to certain road surface conditions, temperature changes or changes in the road inclination angle. The steps S115 to S120 ensure that uniform motion of the car at a constant velocity will not be erroneously determined as the stationary state.

If, upon completion of the above steps S 110 to S120, it is determined that the car is really stopped, the speed measuring apparatus will initialize the counted value $S_k$ to zero "0" at step S125 and set the speed to "0" at step S130.

If it is determined that the current measurement data $f_c$ is different from the previous measurement data $f_{pre}$ at step S110, i.e. the car is still moving, the speed measuring apparatus will initialize the counted value $S_k$ to "0" at step S135 and subtract the irregular constants from the measurement data $f_x$ and $f_y$ in Equation 1 to produce a road angle $\theta_1$ of the road on which the car is moving at step S140. The values $\hat{f}_x$ and $\hat{f}_y$ obtained by subtracting the irregular constants from the measurement data $f_x$ and $f_y$ are represented by Equation 3.

$$\hat{f}_x - B_x = \hat{f}_x = a \cos \alpha + g \sin \alpha \cos \theta_1 + g \cos \alpha \sin \theta_1$$
$$\hat{f}_y - B_y = \hat{f}_y = -a \cos \alpha + g \sin \alpha \cos \theta_1 - g \cos \alpha \sin \theta_1 \quad (3)$$

The x-axis and y-axis values are multiplied by sin α and cos α, respectively, to eliminate the terms in Equation 3 and thereby obtain Equation 4. The x-axis and y-axis values are then summed to create Equation 5.

$$\hat{f}_x \sin \alpha = a \sin \alpha \cos \alpha + g \sin^2 \alpha \cos \theta_1 + g \sin \alpha \cos \alpha \sin \theta_1$$

$$\hat{f}_y \cos \alpha = -a \sin \alpha \cos \alpha + g \sin^2 \alpha \cos \theta_1 - g \sin \alpha \cos \alpha \sin \theta_1 \quad (4)$$

$$\hat{f}_x \sin \alpha + \hat{f}_y \cos \alpha = g \cos \theta_1 \quad (5)$$

If both terms are eliminated to obtain the road angle $\theta_1$ from Equation 5, Equation 6 will be created.

$$\theta_1 = \arccos \{(\hat{f}_x \sin \alpha + \hat{f}_y \cos \alpha)/g\} \quad (6)$$

Although the road angle $\theta_1$ in degrees is obtained using Equation 6, it is uncertain whether the value of angle $\theta_1$ is negative or positive because of the arc-cosine characteristic.

For example, arccos (0.866025) has two solutions, i.e., 30° and −30°. It may not be certain which of the two solutions is true.

However, only road angles greater than a predetermined angle $\theta_{th}$ (for example, 3°) greatly influence the output from the accelerometer. Smaller road angles hardly influence the output from the accelerometer. In the present invention, the sign of the road angle $\theta_1$ is determined only when the road angle $\theta_1$ obtained at step S140 is greater than the predetermined angle $\theta_{th}$ (for example, 3°). A road angle greater than the predetermined angle $\theta_{th}$ is denoted by $\theta_2$, and the speed of the car is calculated by applying the road angle $\theta_2$. In other words, it is first determined whether the road angle $\theta_1$ is greater than the predetermined angle $\theta_{th}$ (for example, 3°) at step S145. Only if it is greater, may the road angle $\theta_2$ be calculated at step S 150.

If it is not greater than the predetermined angle $\theta_{th}$ (for example, 3°), the road angle $\theta_1$ is ignored in the calculation of the speed of the car.

Hereinafter, a process of determining the sign of the road angle $\theta_2$ at step S150 will be explained in detail. To determine the sign of the road angle $\theta_2$ obtained at step S140, the x-axis and y-axis values in Equation 3 are multiplied by cos α and sin α, respectively, thereby obtaining Equation 7. Also, Equation 8 is obtained by subtracting the y-axis value from the x-axis value in Equation 7.

$$f_x \cos \alpha = a \cos^2\alpha + g \sin \alpha \cos \theta_2 + g \cos^2 a \cos \alpha \sin \theta_2$$

$$f_y \sin \alpha = -a \sin^2\alpha + g \sin \alpha \cos \alpha \cos \theta_2 - g \sin^2\alpha \sin\theta_2 \quad (7)$$

$$f_x \cos \alpha - f_y \sin \alpha = a + g \sin \theta_2$$

$$f_x \cos \alpha - f_y \sin \alpha - a = g \sin \theta_2 \quad (8)$$

When the terms on both sides of Equation 8 are reduced to determine the sign of the road angle $\theta_2$, Equation 9 is produced.

$$\theta_2 = \arcsin \{(f_x \cos \alpha - f_y \sin \alpha - a)/g\} \quad (9)$$

The road angle $\theta_2$ obtained by Equation 9 will be more reliable when the motional acceleration of the car is zero and the absolute value of the road angle is greater than the predetermined angle $\theta_{th}$ (for example, 3°).

At step S155, the obtained road angle $\theta_2$ is applied to Equation 3 to remove the gravitational acceleration component from the measurement data of the accelerometer. The solutions of Equation 3 are values excluding irregular constant values from the measurement data of the accelerometer. Accordingly, only the real acceleration of the car is produced from Equation 3. In other words, the motional acceleration component of the car is calculated at step S160, using the measurement data of the accelerometer which compensates for the gravitational acceleration component. The speed is then calculated at step S165 based on the calculated motional acceleration component.

Figure 5:
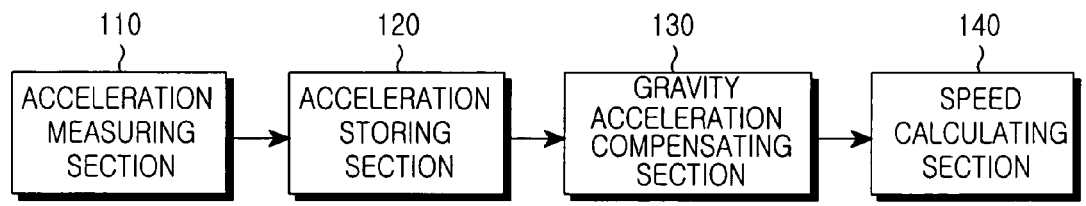
FIG. 5 is a block diagram of an apparatus for measuring the speed of a moving vehicle according to the preferred embodiment of the present invention.

FIG. 5 is a block diagram of an apparatus for measuring the speed of a moving vehicle according to the preferred embodiment of the present invention. Referring to FIG. 5, the speed measuring apparatus includes an acceleration measuring section 110, an acceleration measurement storing section 120, a gravitational acceleration compensating section 130 and a speed calculating section 140.

The acceleration measuring section 110 measures the current acceleration of a moving land vehicle through an accelerometer mounted in the vehicle. The acceleration measuring section 110 measures acceleration(s) corresponding to the number of accelerometer(s). For example, when a biaxial acceleration is mounted in the vehicle, x-axis and y-axis accelerations are measured.

The acceleration measurement storing section 120 stores information about the accelerations measured by the acceleration measuring section 110.

The gravitational acceleration compensating section 130 compensates for gravitational acceleration included in an acceleration measured by the acceleration measuring section 110. More specifically, the gravitational acceleration compensating section 130 calculates an angle of the road on which a vehicle is moving, using the measurement data provided from the accelerometer. The gravitational acceleration compensating section 130 calculates a gravitational acceleration component included in the measurement data using the road angle and compensates for the gravitational acceleration component in the measurement data. In other words, the gravitational acceleration component included in the measurement data is compensated. The operation of the gravitational acceleration compensating section 130 is shown in FIG. 4.

The speed calculating section 140 receives a real acceleration of the vehicle, which has been produced from the gravitational acceleration compensating section 130, and calculates the speed of the vehicle. Since the method for calculating the speed of a vehicle using the acceleration of the vehicle is generally known in the art, a detailed explanation thereof will be omitted.

Figure 6:
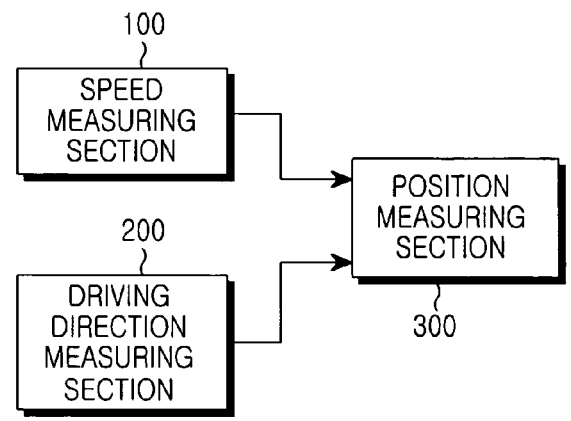
FIG. 6 is a block diagram of a vehicle navigation system utilizing a speed measuring apparatus according to the preferred embodiment of the present invention.

FIG. 6 is a block diagram of a position measuring section in a vehicle navigation system that adopts a speed measuring section 100 according to the preferred embodiment of the present invention. Referring to FIG. 6, the vehicle navigation system includes a speed measuring section 100, a driving direction measuring section 200 and a position measuring section 300. In the vehicle navigation system, the position measuring section 300 receives driving speed information from the speed measuring section 100 and driving direction information from the driving direction measuring section 200 to produce accurate information about the current position of the vehicle.

The present invention calculates an angle of inclination of the road on which a vehicle is moving, based on the measurement data provided from an accelerometer mounted on two mutually orthogonal axes, and compensates for a gravitational acceleration component included in the measurement data of the accelerometer using the road inclination angle. Accordingly, it is possible to reduce the number of expensive gyroscopes needed for a vehicle speed measuring apparatus, thereby reducing the cost of the apparatus.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for measuring the speed of a moving land vehicle using an accelerometer, comprising the steps of:
    storing measurement data provided from an accelerometer;
    analyzing the measurement data to determine whether the vehicle is stopped;
    calculating a road angle using the measurement data of the accelerometer when it is determined, upon analysis, that the vehicle is moving;

determining a sign of the road angle when the road angle is greater than a threshold value;

compensating for a gravitational acceleration component included in the measurement data of the accelerometer using the road angle; and calculating the speed of the vehicle based on the acceleration of the vehicle with the gravitational acceleration component compensated.

2. The method according to claim 1, wherein said storing step stores measurement data provided from a biaxial accelerometer.

3. The method according to claim 2, wherein said analyzing step determines that the vehicle is stopped, if measurement data $f_c$ provided from the accelerometer at certain points of time and previous measurement data $f_{pre}$ are consecutively determined to be identical and the frequency of such consecutive determinations is greater than a threshold value.

4. The method according to claim 2, wherein said road angle calculating step calculates the road angle by subtracting irregular constants from x-axis and y-axis measurement values of the biaxial accelerometer, multiplying the x-axis and y-axis measurement values, with the irregular constants subtracted therefrom, by trigonometric functions to obtain corresponding products and finding the sum of corresponding products.

5. The method according to claim 4, wherein said road angle calculating step multiplies the x-axis and y-axis measurement values, with the irregular constants from subtracted therefrom, by $\sin\alpha$ and $\cos\alpha$ as denoted in Equation (a) to obtain corresponding products, finds the sum of the corresponding products as denoted in Equation (b) to create Equation (c), and calculates the road angle using Equation (c), as set forth below:

$$f_x \sin\alpha = a \sin\alpha \cos\alpha + g \sin^2\alpha \cos\theta + g \sin\alpha \cos\alpha \sin\theta$$

$$f_y \cos\alpha = -a \sin\alpha \cos\alpha + g \sin^2\alpha \cos\theta - g \sin\alpha \cos\alpha \sin\theta \quad (a)$$

$$f_x \sin\alpha + f_y \cos\alpha = g \cos\theta \quad (b)$$

$$\theta_1 = \arccos\{(f_x \sin\alpha + f_y \cos\alpha)/g\} \quad (c)$$

wherein $f_x$ and $f_y$ are values obtained by subtracting the irregular constants from the x-axis and y-axis measurement values of the accelerometer; g is a gravitational constant; $\alpha$ is a mounting angle of the accelerometer; and $\theta$ is an angle of road inclination.

6. The method according to claim 4, wherein said determining step subtracts the irregular constants from the x-axis and y-axis measurement values of the biaxial accelerometer, multiplies each of the two x-axis and y-axis measurement values, with the irregular constants subtracted therefrom, by corresponding trigonometric functions to obtain two corresponding measurement values, and determines the sign of the road angle using a difference between the two corresponding measurement values.

7. The method according to claim 6, wherein said determining step multiplies the x-axis and y-axis measurement values, with the irregular constants subtracted therefrom, by $\cos\alpha$ and $\sin\alpha$ as denoted in Equation (d), subtracts the y-axis measurement value from the x-axis measurement value as denoted in Equation (e) to create Equation (f), and determines the sign of the road angle using Equation (f), as set forth below:

$$f_x \cos\alpha = a \cos^2\alpha + g \sin\alpha \cos\alpha \cos\theta + g \cos^2\alpha \cos\alpha \sin\theta$$

$$f_y = \sin\alpha - a \sin^2\alpha + g \sin\alpha \cos\alpha \cos\theta - g \sin^2\alpha \sin\theta \quad (d)$$

$$f_x \cos\alpha - f_y \sin\alpha = a + g \sin\theta$$

$$f_x \cos\alpha - f_y \sin\alpha - a = g \sin\theta \quad (e)$$

$$\theta = \arcsin\{(f_x \cos\alpha - f_y \sin\alpha - a)/g\} \quad (f)$$

wherein $f_x$ and $f_y$ are values obtained by subtracting the irregular constants from the x-axis and y-axis measurement values of the accelerometer; g is a gravitational constant; $\alpha$ is a mounting angle of the accelerometer; and $\theta$ is an angle of road inclination.

8. The method according to claim 1, wherein said compensating step calculates a gravitational acceleration component included in the measurement data of the acceleration using the road angle and removes the gravitational acceleration component from the measurement data of the accelerometer.

9. An apparatus for measuring the speed of a moving land vehicle using a biaxial accelerometer, comprising the steps of:

an acceleration measuring section for measuring a current acceleration of the vehicle from the accelerometer mounted in the vehicle;

an acceleration storing section for storing information about accelerations measured by the acceleration measuring section on a measurement time basis;

a gravitational acceleration compensating section for analyzing measurement data provided from the accelerometer to determine whether the vehicle is stopped, calculating a road angle using the measurement data when it is determined that the vehicle is moving, determining a sign of the road angle when the road angle is greater than a threshold value, and compensating for a gravitational acceleration component included in the measurement data of the accelerometer using the road angle; and a speed calculating section for calculating the speed of the vehicle based on a real acceleration of the vehicle received from the gravitational acceleration compensating section.

10. The apparatus according to claim 9, wherein said gravitational acceleration compensating section determines that the vehicle is stopped, if measurement data $f_c$ provided from the accelerometer at certain points of time and previous measurement data $f_{pre}$ are consecutively determined to be identical and the frequency of such consecutive determinations is greater than a threshold value.

11. The apparatus according to claim 9, wherein said gravitational acceleration compensating section multiplies x-axis and y-axis measurement values, with irregular constants subtracted therefrom, by $\sin\alpha$ and $\cos\alpha$, respectively as denoted in Equation (a) to obtain corresponding x-axis and y-axis products, finds the sum of the x-axis and y-axis products as denoted in Equation (b) to create Equation (c), and calculates the road angle using Equation (c), as set forth below:

$$f_x \sin\alpha = a \sin\alpha \cos\alpha + g \sin^2\alpha \cos\theta + g \sin\alpha \cos\alpha \sin\theta$$

$$f_y \cos\alpha = -a \sin\alpha \cos\alpha + g \sin^2\alpha \cos\theta - g \sin\alpha \cos\alpha \sin\theta \quad (a)$$

$$f_x \sin\alpha + f_y \cos\alpha = g \cos\theta \quad (b)$$

$$\theta_1 = \arccos\{(f \sin\alpha + f_y \cos\alpha)/g\} \quad (c)$$

wherein $f_x$ and $f_y$ are values obtained by subtracting the irregular constants from the corresponding x-axis and y-axis measurement values of the accelerometer; g is a gravitational constant; $\alpha$ is a mounting angle of the accelerometer; and $\theta$ is an angle of road inclination.

12. The apparatus according to claim 9, wherein said gravitational acceleration compensating section multiplies x-axis and y-axis measurement values, with irregular constants subtracted therefrom, by cos $\alpha$ and sin $\alpha$ as denoted in Equation (d) to obtain corresponding x-axis and y-axis measurement values, subtracts the y-axis measurement value from the x-axis measurement value as denoted in Equation (e) to create Equation (f), and determines the sign of the road angle using Equation (f), as set forth below:

$$f_x \cos \alpha = a \cos^2\alpha + g \sin \alpha \cos \theta + g \cos^2\alpha \cos \alpha \sin \theta$$

$$f_y = \sin \alpha - a \sin^2\alpha + g \sin \alpha \cos \alpha \cos \theta - g \sin^2\alpha \sin \theta \quad (d)$$

$$f_x \cos \alpha - f_y \sin \alpha = a + g \sin \theta$$

$$f_x \cos \alpha - f_y \sin \alpha - a = g \sin \theta \quad (e)$$

wherein $f_x$ and $f_y$ are values obtained by subtracting the irregular constants from the x-axis and y-axis measurement values of the accelerometer; g is a gravitational constant; $\alpha$ is a mounting angle of the accelerometer; and $\theta$ is an angle of road inclination.

13. The apparatus according to claim 9, wherein said gravitational acceleration compensating section calculates a gravitational acceleration component included in the measurement data of the accelerometer using the road angle and removes the gravitational acceleration component from the measurement data.

* * * * *